Figure 1:
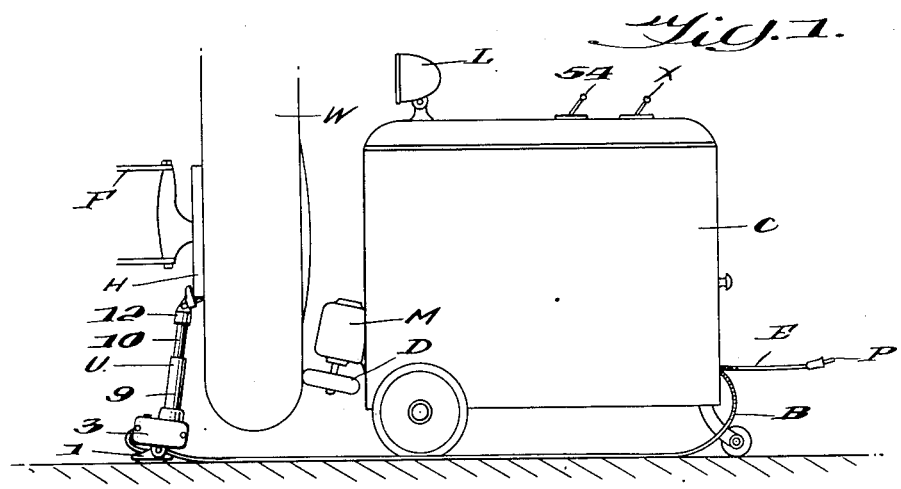

Aug. 28, 1951  E. L. SCHNOEBELEN  2,565,577
SWITCH FOR STATIC AND DYNAMIC BALANCING
Filed May 25, 1948  2 Sheets-Sheet 1

Inventor
EARL L. SCHNOEBELEN,
By Babcock & Babcock
Attorneys

Aug. 28, 1951 E. L. SCHNOEBELEN 2,565,577
SWITCH FOR STATIC AND DYNAMIC BALANCING
Filed May 25, 1948 2 Sheets-Sheet 2

Inventor
EARL L. SCHNOEBELEN,
Babcock & Babcock
Attorneys

Patented Aug. 28, 1951

2,565,577

UNITED STATES PATENT OFFICE 2,565,577

SWITCH FOR STATIC AND DYNAMIC BALANCING

Earl L. Schnoebelen, Rock Island, Ill., assignor to
J. O. Stephenson, Detroit, Mich.

Application May 25, 1948, Serial No. 29,086

9 Claims. (Cl. 200—52)

This invention relates to a vehicle wheel unbalance indicator of the type employing a stroboscopic light circuit and a vibration pick-up unit associated with the wheel and included in said circuit to periodically close same responsive to vibrations of the wheel as caused by unbalance. In particular, the invention relates to the pick-up unit employed in such an indicator.

It is known that a vehicle wheel or other rotatable object is subject to, and during rotation may be adversely affected by both static and dynamic unbalance, the former resulting in vibration of the wheel in a radial plane and the latter resulting in a periodic twisting or oscillation of the wheel about the vertical axis of its king pin.

The unbalanced or heavy points on the wheel causing such different types of unbalance may be and frequently are located at different angular or circumferential positions on the wheel. It is of course necessary in balancing the wheel to ascertain whether either or both of these types of unbalance exist, and to locate the angular or circumferential positions thereof on the wheel so that the wheel may be properly balanced by the application of counterweights at suitable locations, in usual manner.

It is recognized that several stroboscopic unbalance indicators have heretofore been devised, although in general these have either been capable of indicating only one type of unbalance, that is either static or dynamic, or if capable of indicating both types of unbalance have required to be applied to the wheel assembly in different locations or in different manners for each type of unbalance to be indicated.

The present invention has been conceived and developed with the foregoing considerations in mind, and accordingly has for its primary object to provide an unbalance indicator embodying a novel vibration pick-up unit which is capable of detecting and indicating the positions of both statically and dynamically unbalanced points in the wheel from a single operative position relative to the wheel assembly. To this end the vibration pick-up unit embodies a vibration transmitter which in operation engages a part of the wheel assembly for reciprocating and oscillating movement therewith, as caused by static and dynamic unbalance respectively, said transmitter being associated with and operable to actuate two separate sets of contact points, one of said sets being responsive only to static unbalance of the wheel and the other of said sets being responsive only to dynamic unbalance of the wheel.

A further object is to provide such a device or unit which is easily adjustable for application to wheel assemblies of varying types and sizes, wherein such application and the subsequent rotation of the wheel serve automatically to adjust the contacts of both said sets in proper operative relation, while engagement between said contacts with sufficient force to damage same or their associated parts is at all times prevented. In order to accomplish this, the aforesaid vibration transmitter comprises two rigid sections which are connected for vibration together, the connecting means being of such character as to yield and permit relative linear and/or rotary movement between said sections responsive to linear or torsional forces acting on said transmitter substantially in excess of the forces required to actuate same.

A further more specific object is to provide such a yielding connection between the two transmitter sections which embodies a resilient actuating element, the said element also being utilized to serve the additional function of maintaining the transmitter in resilient operative engagement with the wheel assembly for vibration therewith.

Still another object is to provide in such a pick-up unit means for eliminating false or erroneous actuation thereof responsive to rocking movement of the vehicle in its entirety.

Other incidental objects and advantages will be apparent from the following detailed description.

In this application I show and describe only the preferred embodiment of my invention, simply by way of illustration of the practice thereof, as by law required. However I recognize that my invention is capable of other and different embodiments, and that the individual details thereof may be modified in various ways, all without departing from my said invention. Accordingly the drawings and description herein are to be considered as merely illustrative, and not as exclusive.

Figures 4, 5:
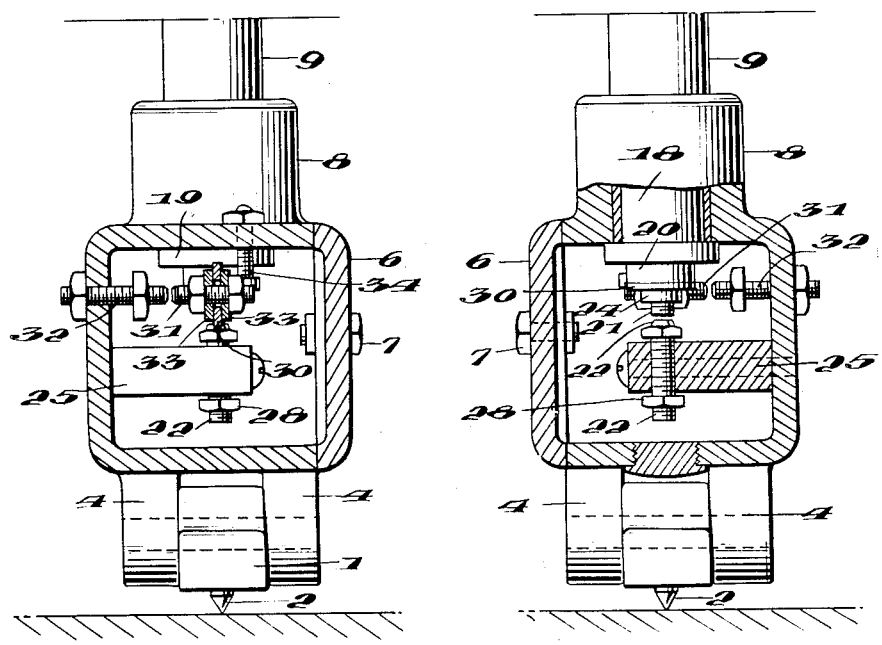
Figures 6, 7, 8:
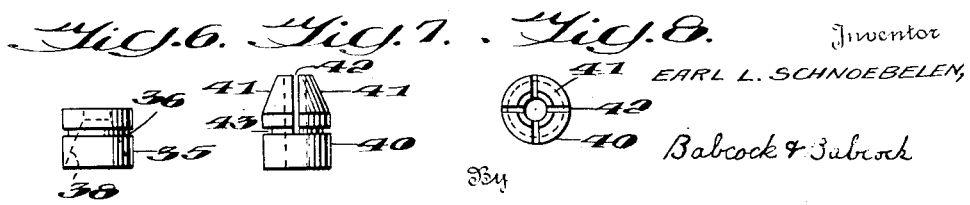
Figure 3:
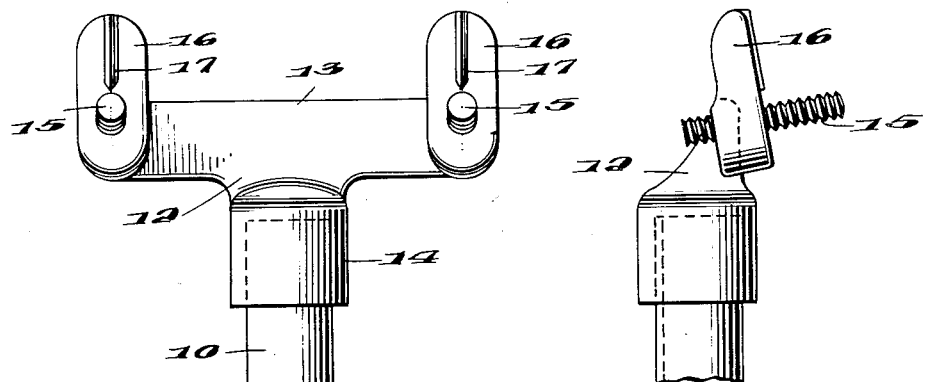
Figure 2:
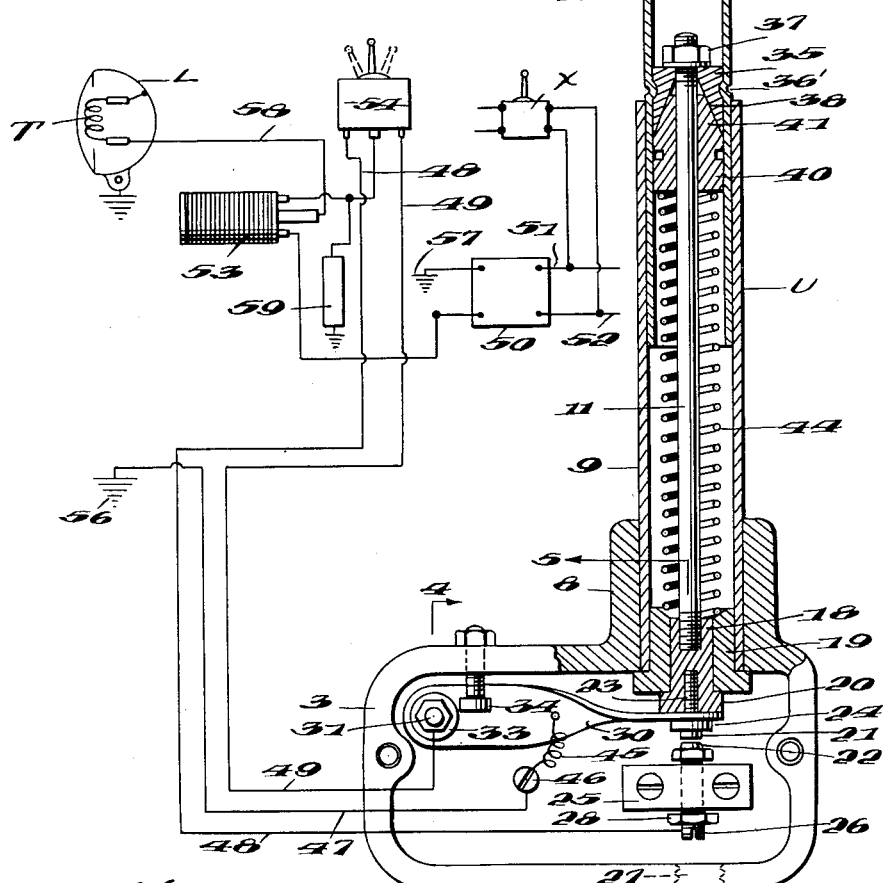

In the accompanying drawings:

Figure 1 represents a fragmentary front elevation of an automobile front wheel assembly having the apparatus of my invention operatively applied thereto;

Figure 2, an enlarged side elevation, partly in section, showing the vibration pick-up unit of the invention with the cover plate of the contact housing removed, and diagrammatically showing the stroboscopic light circuit;

Figure 3, a fragmentary front elevation of the upper end of the pick-up unit showing the details of the pick-up head carried thereby;

Figure 4, a section on the line 4—4 of Figure 2, looking in the direction of the arrows;

Figure 5, a section on the line 5—5 of Figure 2, looking in the direction of the arrows;

Figure 6, a detail side elevation of the chuck compressing bushing constituting part of the yielding connection between the vibration transmitter sections;

Figure 7, a detail side elevation of the chuck which cooperates with said bushing; and Figure 8, a plan view of said chuck.

Referring now in detail to the accompanying drawings, in Figure 1 I have shown the invention as it appears when operatively applied to a vehicle front wheel assembly in association with the stroboscopic light and other equipment normally employed in wheel balancing.

The front wheel assembly, which is diagrammatically shown, is of conventional construction comprising a usual pneumatic tired wheel W mounted on the vehicle frame F for rotation about a horizontal axis and for steering or turning movement about a vertical axis, all as is old and well known in the art.

In the operative relation of the invention with such wheel assembly, the vehicle will be supported with the front wheel W slightly raised from the ground to be free for rotation. Preferably the supporting means will engage the frame of the vehicle medially between the two front wheels in order to permit the wheel W undergoing test to move or vibrate vertically responsive to static unbalance.

The pick-up unit of the invention, designated U in its entirety, rests on the ground or other supporting surface in operative engagement with some non-rotating portion of the wheel assembly which vibrates with the wheel W, as for instance the stationary backing plate or section H of the brake drum housing.

This unit U is actuated by vibration of the wheel W to intermittently close an electrical circuit through a stroboscopic light L which is directed at the wheel and operates in accordance with well known principles to illuminate the wheel which may have any suitable reference point, such as a chalk mark, applied thereto at any suitable circumferential location.

The unbalance of the wheel W will periodically close the circuit at the same position of rotation of said wheel. Due to the rapid rotation of the wheel and the repeated periodic illumination thereof with the reference mark always at the same location, the reference mark will appear to be stationary and thus its position at the instant of unbalance may be easily and accurately noted. The action of the light L and its circuit may be substantially as disclosed in the Forster Patent 2,344,349 or the Snell Patent 728,315.

Preferably the light L and a portion of its actuating circuit will be carried by a wheeled cabinet C, the light L being electrically connected to the pick-up unit U by wires extending through a flexible cable B. The electrical current for the light L may be supplied through a usual electrical cord E having a plug-in connection P adapted for insertion in a usual plug-in socket to receive 110 volt alternating current therefrom.

The cabinet C may also carry an electrical motor M, on the shaft of which is mounted a friction drive wheel or roller D adapted to frictionally engage and rotate the wheel in known manner. The actuating current for the motor M also may be supplied through the cord E.

A usual reversing switch X mounted on the cabinet C may control the action of the drive motor M to cause same to rotate in either a clockwise or counter-clockwise direction, as desired, and a usual double pole switch 54 is interposed in the actuating circuit of the light L in such manner that said switch may be thrown, as desired, to place either of the two sets of contacts of the pick-up unit U in circuit with the light L, thus causing the light to be selectively actuated in response to either static or dynamic unbalance of the wheel W.

I recognize that it has heretofore been known to employ a pick-up unit associated with a wheel assembly to control the electrical circuit through a stroboscopic light directed at the wheel, in order to angularly locate the points of unbalance of the wheel, and accordingly I do not claim this broad general combination of pick-up unit and stroboscopic light as my invention. I have merely referred to same generally in order to facilitate a clear understanding of my invention, which consists primarily in the novel construction and arrangement of the pick-up unit U.

Said pick-up unit U of the invention is illustrated in detail in Figure 2. This unit comprises a suitable base 1 adapted to rest on a horizontal supporting surface and preferably having suitable traction or gripping means, such as the pair of relatively spaced downwardly pointed feet 2, to engage the supporting surface and prevent sliding or twisting of the unit thereon during operation.

Supported on said base 1 is a hollow casing or housing 3 in which are housed the electrical contacts of the invention and various associated elements or portions thereof hereinafter described. Preferably the housing 3 is pivotally connected to the base 1 for swinging movement thereon about a horizontal axis, so that rocking of the vehicle in its entirety or horizontal movement of the backing plate or housing section H responsive to looseness in the wheel assembly, will not cause any perceptible vertical movement of the upper end of the unit and thus will not result in an erroneous actuation of the static contacts.

In the illustrated embodiment such a pivotal connection is provided by forming the casing 3 with a pair of relatively spaced lugs, each designated 4, depending on opposite sides of the base 1, a horizontal pivot pin 5 being journalled through relatively aligned holes formed in said base 1 and said respective lugs 4. It will be noted that the pivot 5 extends transversely to an imaginary line connecting the pointed feet 2 of the base.

The housing 3 may be of any suitable configuration and is preferably of cast metal construction. In the form shown, the housing 3 is provided with a removable side cover plate 6 to permit assembly of and access to the elements contained therein, said plate 6 being secured in place by screws 7, all as shown in Figure 4.

Opening upwardly through the top of the housing 3 is an annular or cylindrical bore which is preferably defined by a cylindrical flange 8 integral with the housing. Fixedly secured in this flange 8 to communicate with the interior of the housing 3 is a tubular metal guide 9, through which the vibration transmitter of the invention is disposed for axial and rotary movement.

Said transmitter preferably comprises an upper tubular metal section 10 telescopically disposed in the guide 9 for axial and rotary movement, and a lower section in the form of a cylindrical rod 11. These sections 10 and 11 are suitably connected in axial alignment for operative vibratory movement as a unit, and suitable means such as the helical compression spring 44 is associated with said unit to urge same resiliently upward into operative engagement with the brake housing section H.

The upper end of the tubular section 10 projects from the guide 9 and is formed or adapted in any suitable manner to engage and vibrate with the said brake housing section H or other non-rotating part of the vehicle wheel assembly. To this end, the transmitter of the preferred embodiment includes a pick-up head 12 which is especially adapted for engagement with said brake housing section H.

Such a pick-up head 12 is formed as an integral metal casting comprising a cross bar 13 having a cylindrical flange 14 depending from the medial portion thereof to snugly receive and be fixedly secured to the upper end of the tubular section 10. Relatively horizontally spaced headless screws 15 are threaded into the said cross bar 13 at points equidistant from the transmitter axis, said screws being disposed to extend beneath and engage the brake housing section H in the operative position of the pick-up unit U as shown in Figure 1.

These screws 15 may be rotated as desired to adjust their effective lengths for use with different types of brake housings, and their threads provide a frictional grip on such housing.

Also, the pick-up head 12 preferably comprises upwardly projecting spaced bosses or projections 16 adapted to engage the vertical surface of the said housing section H and positively connect said housing section and pick-up head for simultaneous oscillating movement. If desired these bosses or abutments 16 may each be formed with one or more raised ribs 17 to frictionally engage the said housing.

The rod 11 comprising the lower section of the transmitter is of relatively small diameter as compared with the internal bores of the tubular section 10 and guide 9, and has its upper end projecting axially into said tubular section 10 and connected to said section 10 for vibratory movement therewith, the preferred form of such connection being described in detail hereinafter.

At its lower end, said rod 11 is threadedly connected to a plug or adapter 18 of relatively larger diameter. This plug 18, which forms part of the transmitter, projects downwardly into the interior of the housing 3 and is guided for axial and rotary movement through a bushing 19 fixedly secured in the lower end of the guide 9. In order to limit the upward reciprocating movement of the plug 18 and rod 11, the said plug may be formed with a flange 20 to abut against the lower flanged end of the bushing 19.

Carried by the transmitter in axial alignment therewith within the housing 3 is a movable static contact 21 which cooperates with a similarly axially aligned stationary static contact 22 in said housing by periodically engaging same responsive to axial vibratory movement of the transmitter. It will be seen that rotary or oscillatory movement of the transmitter, such as caused by dynamic unbalance of the wheel W, will not actuate said static contacts 21 and 22.

The movable static contact 21 of the illustrated embodiment may comprise a headless screw or bolt threaded axially into the lower end of the plug 18 of the transmitter, as shown in Figure 2, though this particular arrangement is by no means essential.

Any suitable construction and arrangement may be employed for the stationary static contact 22. For instance said contact in the illustrated embodiment consists of a headless bolt threaded vertically through a block 25 of insulating material which is bolted or otherwise fixed within the housing 3, as shown in Figures 2, 4 and 5.

In order to facilitate adjustment of the gap between the two static contacts 21 and 22, the lower end of the said bolt or screw 22 is slotted, as at 26, and the housing 3 is provided with a removable plug 27 in axial alignment therewith, so that removal of the plug 27 will permit engagement and adjustment of the contact 22 by a screw driver inserted through the resulting opening. A jam nut 28 may be threaded on the lower end of the said contact 22 and turned into tight frictional engagement with the block 25 to prevent accidental displacement or maladjustment of said contact.

A movable dynamic contact 31 also is carried by the aforementioned transmitter eccentrically to the rotational axis thereof, as by means of a radially projecting arm 30 which is fixedly secured to the lower end of the transmitter, as by passing the threaded contact 21 through said arm and turning a nut 24 on said contact into engagement with the arm to thus secure the arm between said nut and the lower end of the plug 18.

Mounted in the horizontal path of oscillation of the contact 31, to be periodically engaged thereby during oscillatory movement of the transmitter, is a cooperating stationary dynamic contact 32 which may be threaded through the wall of the housing 3 to have its exterior end readily accessible for engagement by any suitable rotating tool, thus providing means for adjusting the gap between the cooperating contacts 31 and 32.

A stop or abutment, such as the screw 34 threaded into the housing 3, may serve to limit the movement of the contact 31 away from contact 32. Where the transmitter consists of yieldably connected section 10 and 11, as in the drawings and the hereinafter following description, the stop 34 serves to maintain the contacts 31 and 32 in operative proximity to each other, despite extensive rotary movement of the upper tubular section 10 of the vibration transmitter such as might occur in placing the pick-up unit in operative position relative to the wheel to be tested.

Due to the eccentric disposition of the dynamic contacts 31 and 32, and their relative actuating movement in a plane transverse to the actuating movement of the static contacts 21 and 22, it will be apparent that the actions of said respective sets of contacts will be entirely independent of each other.

In order to provide for self-adjustment of the two sets of contacts 21—22 and 31—32 respectively, while also preventing engagement between the contacts of either set with sufficient force to damage same or their supporting means, I provide a novel yielding frictional connection between the two transmitter sections 10 and 11 to permit relative axial and/or rotary slippage or yielding movement between these sections responsive to axial and/or rotational forces exerted on the transmitter substantially in excess of the forces required to actuate said contacts 21—22 and 31—32.

I prefer to use the novel and efficient form of such connection illustrated in Figures 2, 6, 7, and 8 of the accompanying drawings. Such a connection comprises a compressor bushing or ring 35 fixedly disposed in the tubular transmitter section 10 and slidably concentrically receiving the rod or lower transmitter section 11. This bushing 35 may be formed of metal and, as shown in detail in Figure 6, may be formed exteriorly with an annular groove 36 adapted to have an annular rib 36' of the tubular section pressed thereinto to maintain said bushing and tube fixedly in assembled relation.

A nut 37 threaded on the upper end of rod 11 for engagement with the bushing 35 is illustrative of one convenient arrangement which may be utilized to limit the downward movement of the rod 11 through bushing 35.

The interior bore of the bushing 35 snugly slidably receives the rod 11 through its upper portion, while the lower portion of said bore diverges downwardly to define a downwardly opening conical recess 38 coaxial with the rod 11.

Slidably disposed on the rod 11 beneath the compressor bushing 35 is a chuck 40 having upwardly directed jaws 41 resiliently radially compressible into frictional gripping engagement with the rod 11. In the preferred embodiment of the invention this chuck 40 is formed as a single integral unit, of a suitable resilient material having a relatively high coefficient of friction, as for instance Bakelite impregnated fabric. A series of circumferentially spaced slots 42 extending in axial planes from the upper end of said chuck serve to separate and define the several jaws 41. An annular groove 43 extends around the chuck at the base of said jaws 41 to increase the flexibility thereof. It will be noted that the said jaws 41 are formed exteriorly with conical surfaces to cooperate with the conical recess of the compressor bushing 35 in obvious manner.

The helical coil spring 44 heretofore mentioned is disposed coaxially about the rod 11 and compressed between the bushing 19 and chuck 40 to exert a resilient upward thrust against the chuck 40 and urge the jaws 41 thereof axially into the conical recess of the bushing 35. This axial thrust in conjunction with the radial forces caused by the interengaging conical surfaces of the jaws 41 and recess 38, causes said jaws to be compressed radially into frictional gripping engagement with the rod 11 and thereby normally maintain the rod 11 and tubular section 10 operatively connected for simultaneous vibratory movement.

However the strength of the spring 44 and the gripping force of the jaws 41 on the rod 11 will be so chosen as to permit relative slipping between said jaws and said rod responsive to exertion on the vibration transmitter of axial or rotary forces substantially in excess of those required for actuation of the contacts 21—22 and 31—32.

It should be particularly noted that the spring 44 is thus utilized in novel manner to urge the transmitter in its entirety into resilient engagement with the wheel assembly, while also being utilized as part of the novel connecting means described above.

The two sets of contacts 21—22 and 31—32 may be provided with any suitable electrical connections whereby they may be selectively included in a stroboscopic light circuit.

Thus in the embodiment of the invention shown in the accompanying drawings the movable static contact 21 is grounded to the housing 3 through the arm 30 and a flexible conductor 45 connecting same to a ground screw 46 threaded into the said housing. A conductor or lead 47 is similarly grounded to the housing 3 in circuit with said contact 21.

The conductor or lead 48 is connected to the stationary static contact 22, as shown, and the said leads or conductors 47 and 48 are adapted for inclusion in the actuating circuit of the light L to close same responsive to engagement of the contacts 21 and 22.

The aforementioned conductor 47 also serves as a lead for the stationary dynamic contact 32, which is grounded to the housing 3, while the movable dynamic contact 31 is connected to a lead or conductor 49, the leads 47 and 49 also being adapted for inclusion in the light actuating circuit to close same responsive to engagement between the contacts 31 and 32.

In the form of light circuit which is shown diagrammatically in Figure 2, simply by way of illustration of one specific application of the invention, the light L is of the inertialess high-tension type employing a neon or other gas filled tube T. The circuit for said light includes a combined transformer and rectifier unit 50 which serves to convert the usual 110 volt alternating current from the supply lines 51—52 into 6–8 volt direct current adapted to energize a usual automobile ignition coil. It will be understood that the lines 51, 52 are housed in the plug in cord B shown in Figure 1.

The primary winding of a usual automobile ignition coil 53 is connected in circuit with the load side of the transformer and rectifier unit 50 and with the center terminal of the control switch 54. Also included in this same circuit is the common lead wire or conductor 47 for the two contacts 21 and 32, said conductor being connected to the load side of the transformer unit 50 through the cabinet C to which both are grounded, as at 56 and 57 respectively.

The outer terminals of the control switch 54 are respectively connected to the conductors 48 and 49 in circuit with the respective contacts 22 and 31, so that the switch 54 may be thrown into either of its two operative positions indicated in dotted lines in Figure 2, to include either of the two sets of contacts 21—22 or 31—32 in circuit with the primary winding of the ignition coil 53. If desired, a condenser 59 may be associated with the ignition coil 53 in usual manner to improve the efficiency thereof.

The secondary winding of the said coil 53 is connected to one terminal of the light L by conductor 58, and the other terminal of said light is grounded to the cabinet C to complete a circuit therethrough, so that the light L will be caused to flash each time the particular set of contacts 21—22 or 31—32 in circuit therewith is actuated.

In the use of the invention, with the wheel W raised from the ground as shown, the pick-up unit U is applied as in Figure 2, the head 12 being retracted downwardly against the pressure of spring 44 to allow said head to be applied in operative relation in resilient upwardly thrusting engagement with the stationary backing plate H of the brake drum.

During such retraction of the head 12, the contacts 21 and 22 will engage, causing the rod 11 to slide axially through the chuck 40 until the desired position of axial adjustment is obtained.

whereupon the frictional grip between the chuck 40 and rod 11 will be reestablished. Also any substantial rotary adjustment of the head 12 such as might be required in order to operatively apply the device will cause the contact 31 to move to one of its limits as defined by either the cooperating contact 32 or by the stop 34, whereupon continued rotary adjustment of said head will break the friction grip of the clutch or chuck 40 on rod 11 to permit the completion of such adjustment without damaging said contacts 31, 32 or moving same out of operative relation with each other.

Then, with the pick-up unit U and light L connected in circuit as aforementioned, and the light directed at the wheel W, the cabinet C is moved toward the wheel until the drive roller D engages the outer side wall of the tire of said wheel, whereupon the motor M may be set in operation by the switch X to produce rotation of the wheel in the desired direction at a high speed. After the wheel has attained the desired speed of rotation, the drive wheel or roller D is withdrawn and the wheel is preferably allowed to coast.

In order to ascertain the presence of any static unbalance in the wheel and the location of the statically unbalanced point, the control switch 54 may be thrown to the left hand position shown in dotted lines in Figure 2, thereby operatively associating the static contacts 21—22 with the light L. In the event the wheel is statically unbalanced it will transmit a vertical reciprocatory movement or vibration to the vibration transmitter of unit U, thus causing the light L to periodically flash and illuminate a suitable reference mark, such as a chalk mark applied to the outer side wall of the tire, each time the heavy or unbalanced point on the wheel reaches its lowermost position of rotation.

The stroboscopic action of the light L will of course cause the position of the reference mark to appear stationary, whereby said position may be carefully and accurately noted with reference to the lowermost point on the wheel W, so that after making proper corrections for the inherent lag the usual counterbalancing weights may be applied at a point on the wheel diametrically opposite to the point of unbalance, all in accordance with known principles.

In order to ascertain the presence and location of any dynamic unbalance, with the pick-up unit U and associated apparatus still applied to the wheel W as aforementioned, the switch 54 is thrown to its right hand position (shown in dotted lines in Figure 2) to place the dynamic contacts 31—32 in operative relation to the light L. Then, with the wheel rotating at high speed, in the event same is dynamically unbalanced, the resultant twisting or oscillating movement of the wheel about its vertical axis of steering movement will be transmitted to the contact 31 through the transmitter of the invention and will cause said contact to periodically engage contact 32 to flash said light L. Such flashing of the light will cause the aforementioned reference mark on the wheel to appear as if stationary in the position which it assumes when the wheel is at the extremity of peak of its oscillation in one direction. By noting such position of the reference mark relative to the then known location of the point of dynamic unbalance, and then making proper corrections or compensations for the inherent lag between the rotation of the wheel and flashing of the light, counterweights may be properly located on the wheel in usual manner to correct its condition of dynamic unabalance.

In the event the amplitude of vibration of either the contact 21 or 31 is greater than the gap between the contacts of its respective set, the resulting force of engagement between the respective contacts of either or both sets will cause the rod 11 to slide in the chuck 40 until said contacts lightly engage each other. Thus it will be seen that the pick-up unit U of the invention is entirely self-adjusting with respect to both sets of contacts.

It will further be apparent that the two sets of contacts 21—22 and 31—32 are operable independently of each other, though both are actuated through movement of the common vibration transmitter, and that said sets of contacts may be selectively interposed in circuit with a stroboscopic light to indicate the locations of both static and dynamic unbalance in a wheel without altering the mode of application of the pick-up unit of the invention to the wheel assembly.

Further it will be noted that any possibility of erroneous indication, such as might be caused by rocking of the pick-up unit U on its base, and consequent vertical movement of the head 12 of the said unit, has been eliminated by the pivotal connection 5 between the base and said unit which pivotal connection reduces the resulting vertical movement to a minimum.

I claim:

1. A vibration pick-up unit comprising, a supporting base, a contact housing mounted thereon for relative pivotal movement about a horizontal axis, a tubular guide communicating with the interior of said housing and projecting upwardly therefrom, a vibration transmitter disposed through said guide for linear and rotary movement, said transmitter comprising an upper tubular section, a pick-up head carried thereby for engagement with a vibrating part of a vehicle wheel assembly, a chuck compressing bushing fixedly disposed in said tubular section, a lower rod section having its upper end slidably disposed through said bushing, a chuck slidably disposed on said rod beneath said bushing, said chuck having upwardly directed jaws compressible radially into frictional gripping engagement with said rod, said jaws having upwardly converging conical surfaces to be received in said bushing, and a helical compression spring disposed in said guide and resiliently urging said chuck upwardly into said bushing to compress said jaws into frictional gripping engagement with said rod, the combined action of said spring and said chuck serving also to maintain said pick-up head in resilient operative engagement with the said wheel assembly, in combination with a movable static contact carried at the lower end of said transmitter, a stationary static contact mounted in said housing in the path of movement of said movable contact, said contacts being in axial alignment with said transmitter to make and break contact responsive solely to axial movement thereof, a movable dynamic contact carried by said transmitter eccentrically to the axis thereof, and a stationary dynamic contact mounted in said housing in the path of oscillation of said movable dynamic contact to be periodically engaged thereby responsive solely to oscillation of said transmitter.

2. A vibration pick-up unit comprising, a contact housing and supporting means therefor, a tubular guide communicating with the interior of said cousing, a vibration transmitter disposed through said guide for axial and rotary movement, said transmitter comprising an upper tubular section, a pick-up head carried thereby for engagement with a vibrating vehicle wheel assembly, a chuck compressing bushing fixedly disposed in said tubular section, a lower rod section having its upper end slidably disposed through said bushing, a chuck slidably disposed on said rod beneath said bushing, said chuck having upwardly directed jaws compressible radially into frictional gripping engagement with said rod, said jaws having upwardly converging conical exterior surfaces to be received in said bushing, and a helical compression spring disposed in said guide and resiliently urging said chuck into said bushing to maintain said jaws in frictional gripping engagement with said rod, the combined action of said spring and chuck serving also to maintain said pick-up head in resilient operative engagement with the wheel assembly, in combination with a movable static contact carried at the lower end of said transmitter, a stationary static contact mounted in said housing for cooperation with said movable contact, said contacts being in axial alignment with said transmitter to make and break contact responsive to axial movement thereof, a movable dynamic contact carried by said transmitter eccentrically to the axis thereof, and a stationary dynamic contact mounted in the path of oscillation of said stationary dynamic contact to be periodically engaged thereby responsive to oscillation of said transmitter.

3. A vibration pick-up unit comprising, a contact housing and supporting means therefor, a tubular guide communicating with the interior of said housing, a vibration transmitter disposed through said guide for axial and rotary movement therein, said transmitter comprising axially aligned upper and lower sections, a pick-up head carried by said upper section for engagement with a vibrating wheel assembly, and means yieldably frictionally connecting said sections for axial and rotary movement as a unit, and a spring exerting a resilient axial thrust against said transmitter to maintain said pick-up head in operative engagement with said wheel assembly, in combination with a movable static contact carried by the lower section of said transmitter, a stationary contact mounted in said housing for cooperation with said movable contact, said static contacts being in axial alignment with said transmitter to make and break contact responsive to axial movement thereof, a movable dynamic contact carried by said lower section eccentrically to the axis thereof for rotary movement therewith, and a stationary dynamic contact mounted in said housing in the path of rotary movement of said movable dynamic contact to be periodically engaged thereby responsive to oscillation of said transmitter.

4. A vibration pick-up unit comprising, a supporting base, a contact housing mounted thereon for relative pivotal movement, a tubular guide communicating with the interior of said housing, a vibration transmitter disposed through said guide for axial and rotary movement therein, said transmitter being adapted for engagement with a wheel assembly to receive axial and rotary vibrations therefrom, and means exerting a resilient axial thrust against said transmitter to maintain same in operative engagement with said wheel assembly, in combination with a movable static contact carried by said transmitter, a stationary static contact mounted in said housing for cooperation with said movable contact, both of said contacts being in axial alignment with said transmitter to make and break contact responsive to axial movement thereof, a movable dynamic contact carried by said transmitter eccentrically to the axis thereof for rotary movement therewith, and a stationary dynamic contact mounted in said housing in the path of rotary movement of said movable dynamic contact to be periodically engaged thereby responsive to oscillation of said transmitter.

5. A vibration pick-up unit comprising, a contact housing and supporting means therefor, a tubular guide communicating with the interior of said housing, a vibration transmitter disposed through said guide for axial and rotary movement therein, said transmitter being adapted for engagement with a wheel assembly to receive axial and rotary vibrations therefrom, and means exerting a resilient axial thrust against said transmitter to maintain same in operative engagement with said wheel assembly, in combination with a movable static contact carried by said transmitter, a stationary static contact mounted in said housing for cooperation with said movable contact, said contacts being in axial alignment with said transmitter to make and break contact responsive to axial movement thereof, a movable dynamic contact carried by said transmitter eccentrically to the axis thereof for rotary movement therewith, and a stationary dynamic contact mounted in said housing in the path of rotary movement of said movable dynamic contact.

6. A vibration pick-up unit comprising, a contact housing and supporting means therefor, a tubular guide communicating with the interior of said housing, a vibration transmitter disposed through said guide for axial and rotary movement therein, said transmitter being adapted for engagement with a wheel assembly to receive axial and rotary vibrations therefrom, and means exerting a resilient axial thrust against said transmitter to maintain same in operative engagement with said wheel assembly, said transmitter comprising axially aligned sections and means yieldably frictionally connecting said sections for axial and rotary movement as a unit, in combination with a movable static contact carried by said transmitter, a stationary static contact mounted in said housing for cooperation with said movable contact, said contacts being in axial alignment with said transmitter to make and break contact responsive to axial movement thereof, a movable dynamic contact carried by said transmitter eccentrically to the axis thereof for rotary movement therewith, and a stationary dynamic contact mounted in said housing in the path of rotary movement of said movable dynamic contact.

7. A vibration pick-up unit comprising a contact housing and supporting means therefor, a tubular guide communicating with the interior of said housing, a vibration transmitter disposed through said guide for axial movement therein, said transmitter being adapted for engagement with a wheel assembly to receive axial vibrations therefrom, and means exerting a resilient axial thrust against said transmitter to maintain same in operative engagement with said wheel assembly, said transmitter comprising axially aligned sections and means yieldably frictionally connecting said sections for axial movement as a unit, in combination with a movable static contact carried by said transmitter, and a stationary static contact mounted in said housing for cooperation with said movable contact, said contacts being in axial alignment with said transmitter to make and break contact responsive to axial movement thereof.

8. A vibration pick-up unit comprising, a contact housing and supporting means therefor, a tubular guide communicating with the interior of said housing, a vibration transmitter disposed through said guide for rotary movement therein, said transmitter being adapted for engagement with a wheel assembly to receive rotary vibrations therefrom, and comprising axially aligned sections and means yieldably frictionally connecting same for rotary movement as a unit, in combination with a movable dynamic contact carried by said transmitter eccentrically to the axis thereof for rotary movement therewith, and a stationary dynamic contact mounted in said housing in the path of rotary movement of said movable dynamic contact.

9. A vibration pick-up unit comprising, a tubular guide, means providing a stationary support for same, a vibration transmitter disposed for axial and rotary movement through said guide, said transmitter being adapted for engagement with a wheel assembly to receive axial and rotary vibrations therefrom, and means resiliently urging said transmitter into operative engagement with said wheel assembly, said transmitter comprising axially aligned sections and means yieldably frictionally connecting said sections for axial and rotary movement as a unit, in combination with a movable static contact carried by said transmitter, a stationary static contact mounted for cooperation with said movable contact, both of said contacts being in axial alignment with said transmitter to make and break contact responsive to axial movement thereof, a movable dynamic contact carried by said transmitter eccentrically to the axis thereof for rotary movement therewith, and a stationary dynamic contact mounted in the path of rotary movement of said movable dynamic contact.

EARL L. SCHNOEBELEN.

REFERENCES CITED

The following references are of record in the file of this patent:

UNITED STATES PATENTS

| Number | Name | Date |
|---|---|---|
| Re. 22,845 | Worthington | Feb. 18, 1947 |
| 563,184 | Kirsch-King | June 30, 1896 |
| 1,420,295 | Tait | June 20, 1922 |
| 1,586,004 | Regelein et al. | May 25, 1926 |
| 1,614,573 | Regelein et al. | Jan. 18, 1927 |
| 1,893,371 | Knowlton | Jan. 3, 1933 |
| 1,919,208 | Douglas | July 25, 1933 |
| 2,018,160 | Weaver | Oct. 22, 1935 |
| 2,210,790 | Bernhard | Aug. 6, 1940 |
| 2,341,444 | Hunter | Feb. 8, 1944 |
| 2,344,349 | Forster | Mar. 14, 1944 |